United States Patent
Hsu et al.

(10) Patent No.: US 7,123,470 B2
(45) Date of Patent: Oct. 17, 2006

(54) HORIZONTAL COMPUTER MOUNTING ARRANGEMENT

(75) Inventors: Ming-Chun Hsu, Taipei (TW); Hsiu-Wen Chang, Taipei (TW); Yung-Wei Tai, Taipei (TW)

(73) Assignee: Tatung Co., Ltd., Taipei (TW)

( * ) Notice: Subject to any disclaimer, the term of this patent is extended or adjusted under 35 U.S.C. 154(b) by 63 days.

(21) Appl. No.: 10/978,484

(22) Filed: Nov. 2, 2004

(65) Prior Publication Data

US 2005/0276004 A1 Dec. 15, 2005

(30) Foreign Application Priority Data

Jun. 10, 2004 (TW) .............................. 93209157 U

(51) Int. Cl.
*G06F 1/16* (2006.01)
(52) U.S. Cl. ....................... 361/679; 361/683; 361/790
(58) Field of Classification Search ................ 361/679, 361/683, 684, 686, 735, 754, 785, 788, 790, 361/747; 439/61, 160, 928, 928.1; 312/222, 312/223.1, 223.2; 174/138 G, 17 CT, 35 GC, 174/35 R See application file for complete search history.

(56) References Cited

U.S. PATENT DOCUMENTS

| 5,175,669 | A | * | 12/1992 | Navia et al. | 361/683 |
| 5,338,214 | A | * | 8/1994 | Steffes et al. | 439/160 |
| 5,544,006 | A | * | 8/1996 | Radloff et al. | 361/683 |
| 5,831,821 | A | * | 11/1998 | Scholder et al. | 361/686 |
| 6,055,152 | A | * | 4/2000 | Felcman et al. | 361/683 |
| 6,373,691 | B1 | * | 4/2002 | Chen | 361/683 |
| 6,404,624 | B1 | * | 6/2002 | Jeong | 361/683 |
| 6,762,943 | B1 | * | 7/2004 | Yen | 361/801 |
| 6,958,916 | B1 | * | 10/2005 | Roesner et al. | 361/790 |

\* cited by examiner

*Primary Examiner*—Michael Datskovskiy
(74) *Attorney, Agent, or Firm*—Bacon & Thomas, PLLC

(57) ABSTRACT

A horizontal computer mounting arrangement includes a case having a bottom panel defining motherboard mounting area and a borderland area, a motherboard mounted in the case corresponding to the motherboard mounting area, an adapter vertically inserted into one vertical slot of the motherboard and having a plurality of horizontal slots for receiving a variety of computer interface cards above the borderland area.

4 Claims, 5 Drawing Sheets

HORIZONTAL COMPUTER MOUNTING ARRANGEMENT

BACKGROUND OF THE INVENTION

1. Field of the Invention

The present invention relates to the arrangement of a computer case and more particularly, to the arrangement of a computer case for horizontal computer.

2. Description of Related Art

Due to limited inside space, the case of a horizontal computer fits only one particular model of motherboard. Therefore, the user of a horizontal computer cannot purchase a different model of motherboard from the market to upgrade the computer. When wishing to upgrade the computer, the consumer shall have to buy a new computer. In this case, the disposal of the old computer is a problem. To the manufacturer, it is not an economic way to design a computer case that fits only one particular model of motherboard. When developed a new motherboard, the manufacturer shall have to invest a lot of money to design a new computer case for the new motherboard.

However, there is a limitation on the size of a computer case. Due to limited vertical height of a horizontal computer, the space between the computer case and the motherboard is insufficient to accommodate interface cards. Further, an interface card has a limitation on height. In order to accommodate more pieces of interface cards in a server, the case of the server must be made relatively bigger. However, increasing the size of the case relatively makes the server bulky and heavy, not in conformity with the requirement for small-scale mechanization.

SUMMARY OF THE INVENTION

The present invention has been accomplished under the circumstances in view. According to the present invention, the horizontal computer mounting arrangement is comprised of a case, a motherboard, an adapter and a plurality of interface cards. The case comprises a bottom panel, which defines a motherboard mounting area and a borderland area beyond the motherboard mounting area. The motherboard is mounted in the case corresponding to the motherboard mounting area, having a vertical slot. The vertical slot has an upwardly extended opening.

The adapter is vertically downwardly inserted into the vertical slot of the motherboard. The adapter comprises a plurality of horizontal slots. Each horizontal slot has a horizontally extended opening.

The invention further comprises a plurality of interface cards respectively inserted into the horizontal slots and suspending above the borderland area of the bottom panel of the case. The horizontal computer mounting arrangement of the present invention allows the case to house any of a variety of motherboards, thereby saving hardware development cost and adding convenience to the use of the computer.

DETAILED DESCRIPTION OF THE PREFERRED EMBODIMENT

Figure 1:
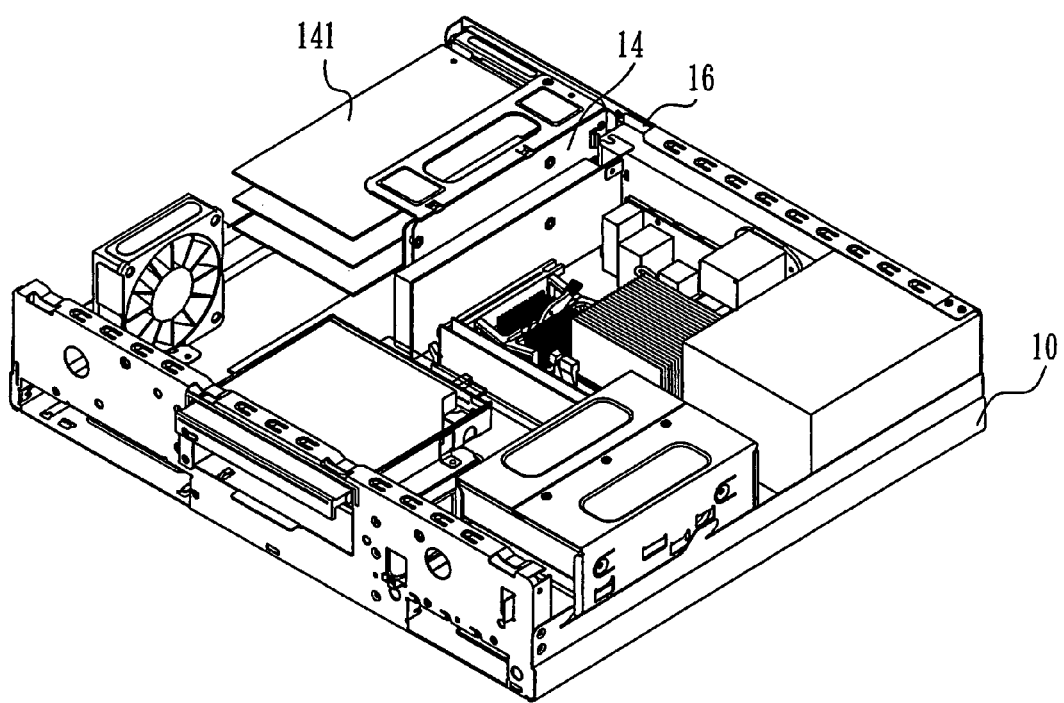
FIG. 1 is a perspective assembly view of a horizontal computer mounting arrangement according to the present invention.
Figure 2:
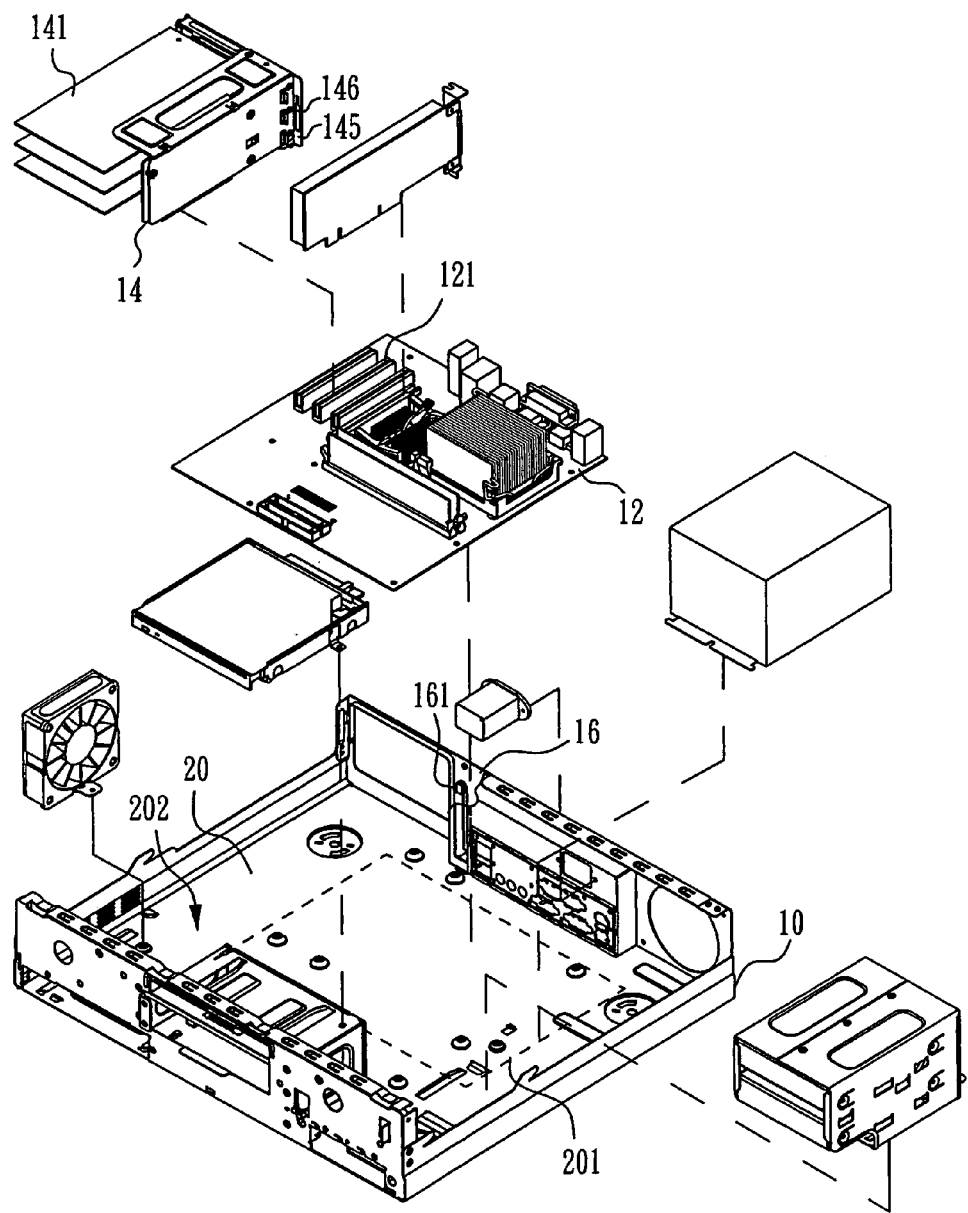
FIG. 2 is an exploded view of the horizontal computer mounting arrangement according to the present invention.

Referring to FIGS. 1 and 2, a horizontal computer mounting arrangement in accordance with the present invention is shown comprised of a case 10, a motherboard 12, and an adapter 14.

According to the present preferred embodiment, the case 10 is made subject to the size of a standard horizontal electric home appliance (for example, the size of a home DVD player), having the dimensions of 430×375×90 mm. The case 10 comprises a bottom panel 20. The bottom panel 20 has a motherboard mounting area 201. The motherboard 12 is installed in the case 10 above the motherboard mounting area 201 of the bottom panel 20. According to the present preferred embodiment, the motherboard 12 is a Micro ATX series motherboard having the dimensions of 243.84×243.84 mm. The motherboard 12 comprises a plurality of vertical slots 121, each vertical slot 121 having an upwardly extended opening.

Figure 3:
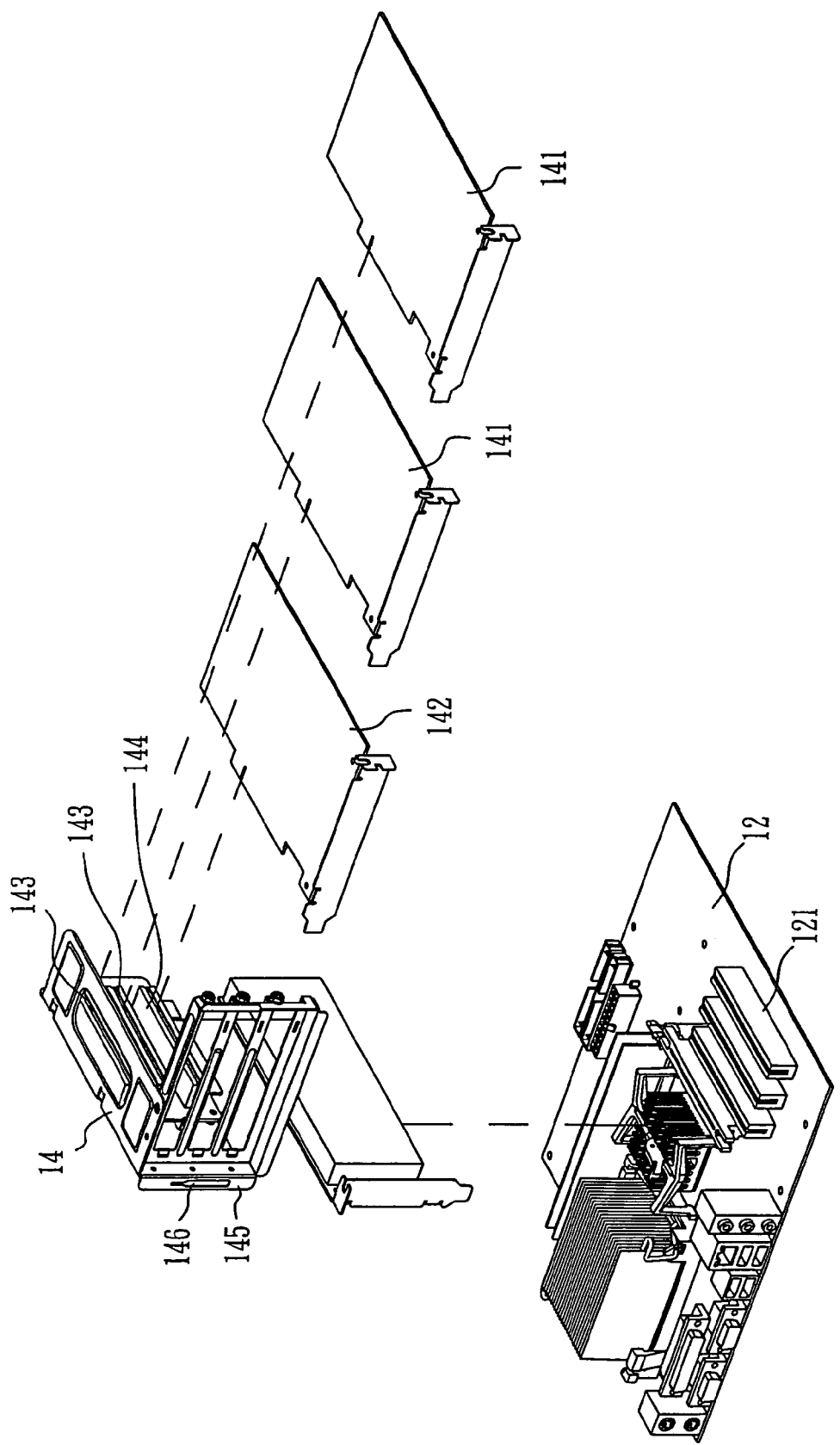
FIG. 3 is an exploded view of a part of the present invention, showing the arrangement of the adapter and the related interface cards.
Figure 4:
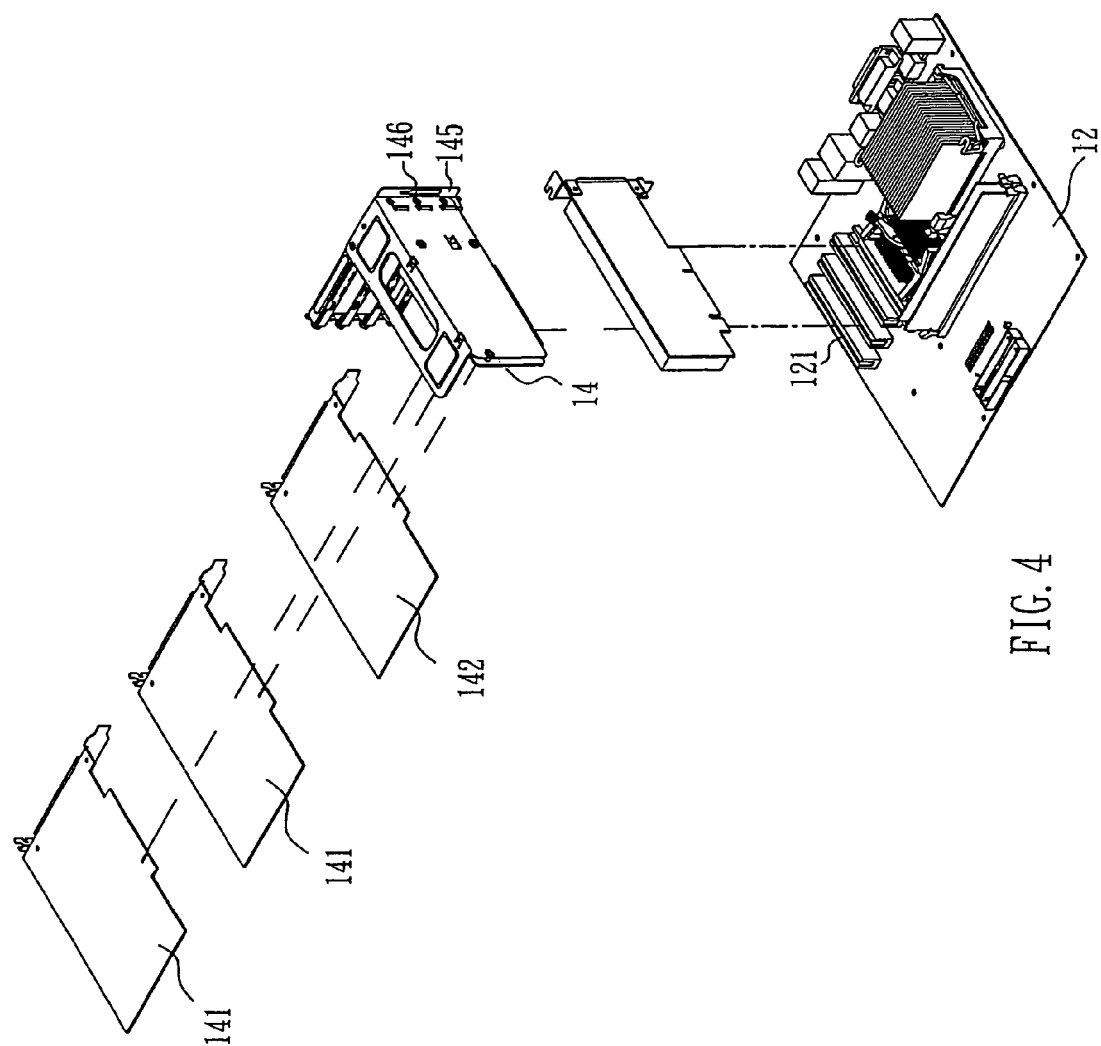
FIG. 4 corresponds to FIG. 3 but viewed from another angle.

Referring to FIGS. 3 and 4, the aforesaid adapter 14 is vertically downwardly inserted into one vertical slot 121 of the motherboard 12 (see FIG. 3), having three horizontal slots 143, 144 horizontally arranged at different elevations. The three horizontal slots 143, 144 include two long profile slots 143 and one short profile slot 144. Each of the horizontal slots 143, 144 has a transversely extended opening. Interface cards 141, 142 are respectively inserted into the horizontal slots 143, 144 and suspending above the borderland area 202 beyond the motherboard mounting area 201 of the bottom panel 20 of the case 10.

The aforesaid interface cards 141, 142 include two long profile adapters 141 and one short profile adapter 142. The long profile adapters 141 are respectively installed in the long horizontal slots 143. The short profile adapter 142 is installed in the short horizontal slot 144.

Figure 2A:
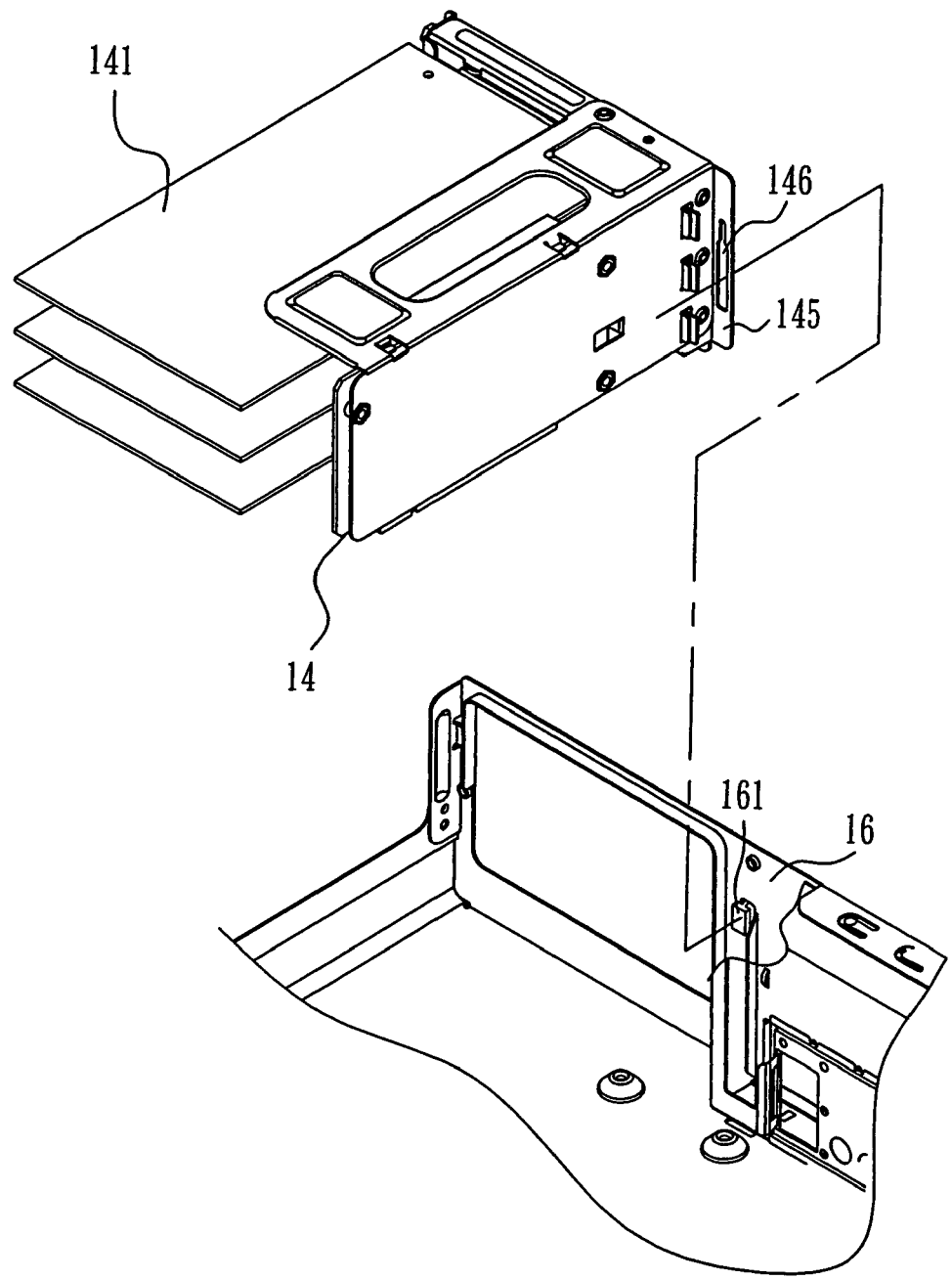
FIG. 2A is a perspective view showing attachment of the adapter to a vertical back panel of the case, through engagement of an engagement groove of the adapter with an engagement protrusion of the vertical back panel.

The aforesaid case 10 further comprises a vertical back panel 16. As shown in FIG. 2 and FIG. 2A, the vertical back panel 16 has an engagement protrusion 161. The aforesaid adapter 14 comprises a mounting panel 145 vertically and downwardly extended from a top side of the adapter 14. The mounting panel 145 has an engagement groove 146 for receiving the engagement protrusion 161 of the vertical back panel 16 so as to secure the adapter 14 to the vertical back panel 16 of the case 10.

As indicated above, the interface cards 141, 142 are horizontally inserted into the horizontal slots 143, 144 of the adapter 14. This horizontal interface card mounting design fully utilizes the limited inside space of the case 10, allowing the limited inside space of the case 10 to accommodate more pieces of interface cards.

Although the present invention has been explained in relation to its preferred embodiment, it is to be understood that many other possible modifications and variations can be made without departing from the spirit and scope of the invention as hereinafter claimed.

What is claimed is:

1. A horizontal computer mounting arrangement comprising:
- a case, comprising a bottom panel having a motherboard mounting area and a borderland area beyond said motherboard mounting area, and a vertical back panel having an engagement protrusion;
- a motherboard mounted in said case corresponding to said motherboard mounting area and comprising at least one vertical slot, each said vertical slot having an upwardly extended opening;
- an adapter vertically downwardly inserted into one said vertical slot of said motherboard, comprising a plurality of horizontal slots, each having a horizontally extended opening, and a mounting panel vertically downwardly extended from a top side of the adapter and having an engagement groove for receiving the engagement protrusion of the vertical back panel so as to secure the adapter to the vertical back panel of the case; and
- a plurality of interface cards respectively inserted into said horizontal slots and suspending above the borderland area of said bottom panel of said case.

2. The horizontal computer mounting arrangement as claimed in claim 1, wherein the horizontal slots of said adapter include at least one horizontal slot adapted to receive a long profile interface card.

3. The horizontal computer mounting arrangement as claimed in claim 1, wherein the horizontal slots of said adapter include at least one horizontal slot adapted to receive a short profile interface card.

4. The horizontal computer mounting arrangement as claimed in claim 1, wherein said case is made subject to the dimensions of a standard horizontal electric home appliance.

* * * * *